UNITED STATES PATENT OFFICE.

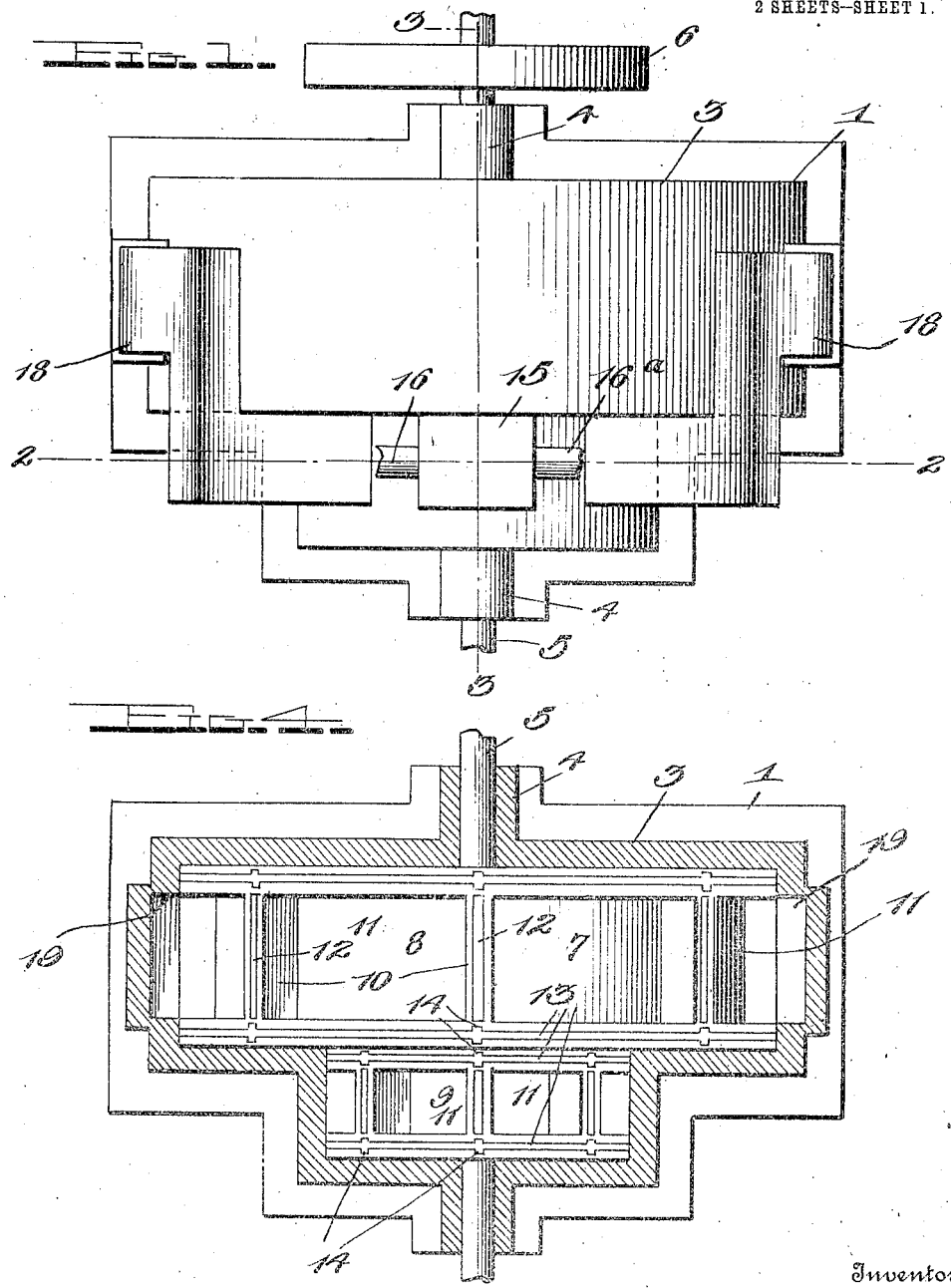

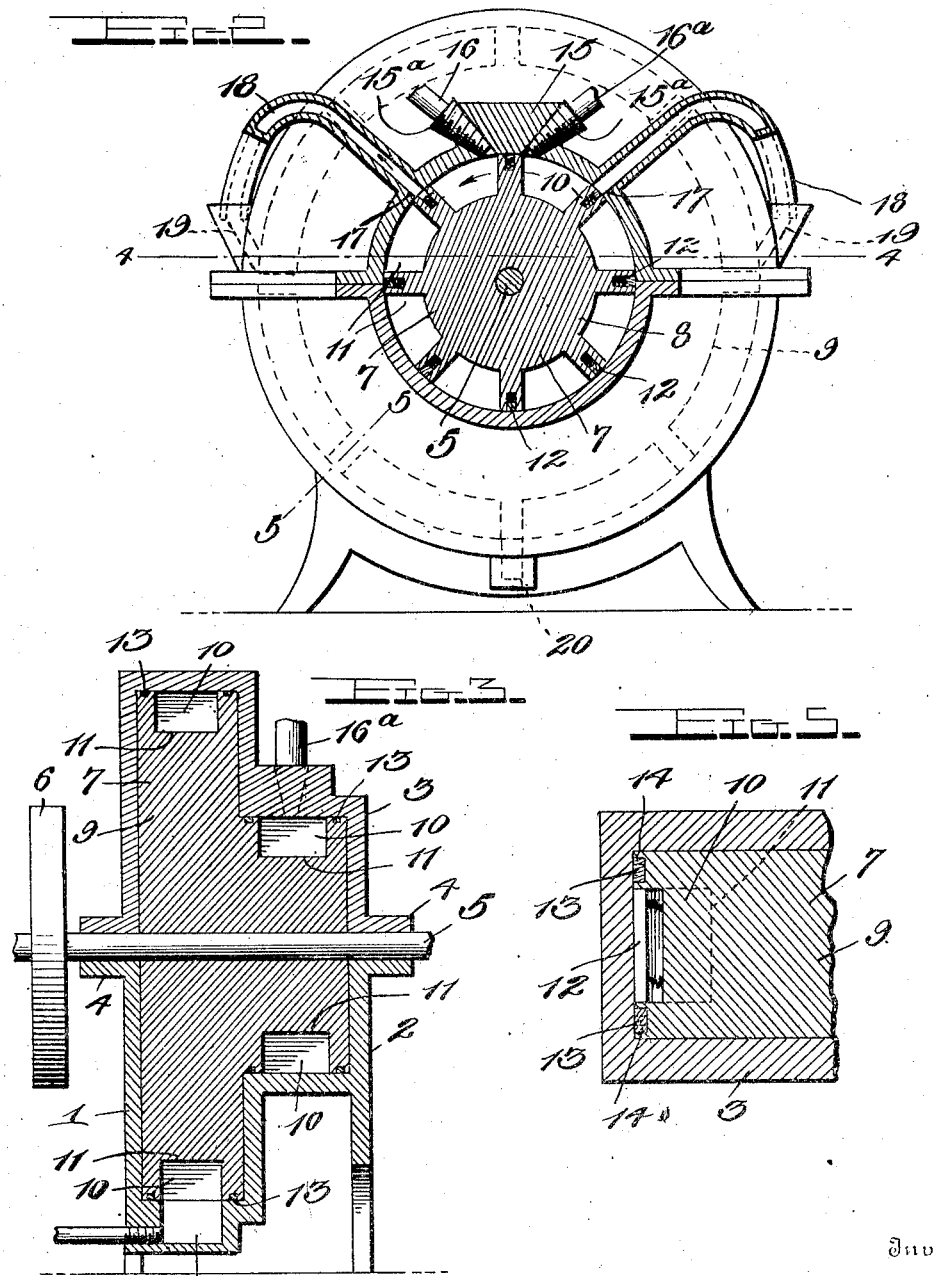

ARTHUR C. HALL, OF HANNIBAL, NEW YORK.

ROTARY ENGINE.

1,047,208.  Specification of Letters Patent.  Patented Dec. 17, 1912.

Application filed March 12, 1912. Serial No. 683,307.

*To all whom it may concern:*

Be it known that I, ARTHUR C. HALL, a citizen of the United States, residing at Hannibal, in the county of Oswego and State of New York, have invented certain new and useful Improvements in Rotary Engines, of which the following is a specification, reference being had to the accompanying drawings.

This invention comprehends certain new and useful improvements in rotary steam engines or turbines, and the invention has for its primary object a simple, durable and efficient construction of rotary engine of the impulse type, which will be cheap to manufacture, easy to maintain, capable of being readily reversed and susceptible of the greatest amount of high pressure power and speed from a given amount of fuel when attached or connected to any simple or forced draft boiler with equal results, whether stationary or movable.

The invention also has for one of its main objects an engine of this type which, in operation, will supply one continuous stream or current of live steam exhausting from one compartment into an adjoining compartment, and an engine which will conserve to the highest degree the velocity of the steam, owing to the fact that the moment one chamber or compartment is filled, that instant the preceding compartment in the direction of rotation, will exhaust and the steam will flow directly over to the other side of the rotor.

The invention also has for one of its main objects a simple rotary steam engine having a predetermined number of chambers or compartments, according to the size of the engine and the horse power it is intended to develop, and one in which the steam is not confined in the pockets or chambers of the rotor, but immediately exhausted therefrom without being permitted to lose initial velocity and expansive force.

A further object of the invention is an engine of this character in which the exhaust passages leading from one side of the rotor to the other are laterally elongated to an extent equal to the width of the compartments or chambers of the rotor, whereby the steam may be passed in the quickest possible manner from one side of the rotor to the other. And the invention also aims to generally improve this class of devices and to render them more useful and commercially desirable.

With these and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing in which, Figure 1 is a top plan view of a rotary engine constructed in accordance with my invention. Fig. 2 is a sectional view on the line 2—2, of Fig. 1. Fig. 3 is a transverse section on the line 3—3, of Fig. 1. Fig. 4 is a horizontal sectional view on the line 4—4, of Fig. 2, and, Fig. 5 is a detail sectional view on the line 5—5, of Fig. 2.

Corresponding and like parts are referred to in the following description and designated in the accompanying drawing by like reference characters.

Referring to the drawing, the numeral 1 designates the casing of my improved rotary steam engine, the same being preferably constructed in a base section 2 supported on any desired foundation or bed and an upper or cover section 3. The sections may be connected together in any desired way and are formed at their opposite sides and at their abutting edges with bearings 4 for the shaft 5 which is provided at one end with a fly or drive wheel 6. Secured to the shaft 5, is a rotor 7 which embodies two main parts integrally or otherwise connected together, the parts being of different diameters and the smaller and initially acting part being designated 8, while the relatively large portion is designated 9. Each of these parts of the rotor 7 is divided by transverse partitions 10 into a predetermined number of steam chambers or compartments 11 which are preferably packed not only by transverse packing strips 12 that are preferably spring pressed out into engagement with the interior wall of the casing 1, but by packing rings 13 which preferably fit in grooves formed in the rims of the rotor and which are provided with lateral nibs or lugs 14 adapted to fit within corresponding sockets formed in the rims, whereby the rings will be compelled to rotate with the rotor and the operation of oiling any worn part thereby facilitated.

The upper or cover section 3 of the casing 1 is provided on its top with a steam chest 15 which is formed at opposite ends with openings into which oppositely extending supply pipes 16 and 16ᵃ extend, whereby to admit steam into the casing in direct contact with the chambers of the initially acting part 8 of the rotor. The cover section 3 of the casing is also formed at equal distances from opposite sides of the steam chest 15 with laterally elongated ports 17 which are connected by correspondingly shaped pipes 18 with laterally elongated ports 19 leading into the relatively large portion 9 of the rotor.

It is to be particularly noted that the parts are so arranged that the steam is carried around in the chambers or compartments of the initially acting part 8 of the rotor from the time it enters said compartments only a distance equal to the distance between two adjacent partitions 10, at which time, the steam is directly and instantly transferred to the chambers of the large portion 9 of the rotor, whereby the steam is exhausted from one compartment and instantly transferred to another before it shall have had time to lose its initial velocity and efficient impulse, and whereby also a continuous stream of steam is produced, instead of successive puffs. It is also to be noted that the partitions 10 of the compartments of the larger part 9 of the rotor are so related to the partitions 9 of the initially acting or smaller part 8, that the partitions of one part will register with the ports 17 at exactly the same time the partitions of the other part register with the ports 19. Hence, the steam will instantly be passed from one compartment to another and by the shortest possible route, whereby it is given no opportunity at all to cool or otherwise lose its velocity and efficiency of impulse. The steam is exhausted through the laterally widened port 20, which, in the present instance, is at the bottom of the casing.

From the foregoing description in connection with the accompanying drawing, the operation of my improved rotary steam engine, will be apparent. In the practical use of the engine, it will be understood that the rotor may be turned in one direction or the reverse according to whether the steam be admitted into the chest 15 through the supply pipe 16 or the supply pipe 16ᵃ. Thus the engine can be instantly reversed by opening one pipe and shutting off the other. When the steam is admitted into the chest 15, it will fill one of the compartments of the initially acting part 8 of the rotor and act with impulse on the rotor, and instantly thereafter the steam will be exhausted through one of the pipes 18 according to the direction in which the rotor is turning, while at the same time a succeeding compartment or chamber is being filled. Hence, there will be a continuous flow of the steam from one pocket to an adjoining pocket and the maximum power of the steam thereby secured, as the steam is passed directly from one compartment to another, and not compelled to traverse any circuitous route or pass through any valves.

It will thus be seen that I have provided a very simple and extremely efficient rotary steam engine or turbine which will conserve the fuel supplied and secure a maximum efficiency with a minimum amount of fuel expenditure. It will further be noted that with my invention, there is a constant supply of strong exhaust steam which may be used for forced draft in connection with portable engines, the exhaust steam being passed into the smoke stack of the boiler just above the fire box, whereby the heat will be generated quickly and evenly and with less consumption of fuel than is required should the steam be passed into the stack or flue in successive puffs.

While the accompanying drawing illustrates what I believe to be the preferred embodiment of my invention, it is to be understood that the invention is not limited thereto, but that various changes may be made in the construction, arrangement and proportions of the parts without departing from the scope of the invention, as defined in the appended claims.

What I claim is:—

1. A rotary engine, comprising a casing, a shaft journaled therein, a rotor mounted on said shaft and embodying two parts of different diameters, each of which parts is divided into a plurality of peripheral steam pockets, the casing being formed with a steam inlet opening communicating with the periphery of the smaller part of the rotor and with a passage leading on the exterior of the casing from the periphery of the smaller part of the rotor directly to the periphery of the larger part of the rotor at a distance less than the circumference of the smaller part of the rotor and the casing being further formed with a final exhaust port leading from the periphery of the larger part of the rotor a distance from said passage less than the circumference of the larger part of the rotor, whereby steam admitted into the casing will act directly upon the smaller part of the rotor and will be shunted direct to the larger part of the rotor before being carried around a complete revolution and will be exhausted from the larger part of the rotor before being carried around a complete revolution therein.

2. A rotary engine of the character described, comprising a casing, a shaft journaled therein, a rotor mounted on said shaft and embodying two parts of different diameters, each of which parts is divided into a plurality of peripheral steam pockets, the casing being formed with a steam inlet opening leading into the periphery of the smaller part of the rotor and with a passage leading from said periphery to the periphery of the larger part of the rotor and with an exhaust port leading directly out from the casing from the periphery of the larger part of the rotor, the circumferential distance relative to the casing from the inlet port to the final exhaust being less than the complete circumference of the casing, whereby the steam will be admitted into the smaller part of the rotor, thence shunted directly to the larger part of the rotor and exhausted from the casing before it is carried around in either part of the rotor for a complete revolution thereof, the ports being so positioned that a pocket of the smaller part of the rotor will instantly discharge into the adjoining pocket of the larger part of the rotor while a succeeding pocket of the relatively smaller part of the rotor is being filled.

3. In an engine of the character described, a casing, a rotor mounted therein and provided with a plurality of transverse partitions and circular rims to which the partitions are connected, outwardly spring pressed packing strips secured to said partitions, and packing rings secured to said rims, the rims being formed with annular grooves receiving said rings and also with sockets opening into said grooves and the rings being formed at predetermined points with nibs fitting in said sockets.

In testimony whereof I hereunto affix my signature in the presence of two witnesses.

ARTHUR C. HALL.

Witnesses:
 BRYCE E. GREEN,
 FLOYD G. BARNUM.